US010223403B2

(12) United States Patent
Malhotra et al.

(10) Patent No.: US 10,223,403 B2
(45) Date of Patent: Mar. 5, 2019

(54) ANOMALY DETECTION SYSTEM AND METHOD

(71) Applicant: Tata Consultancy Services Limited, Mumbai (IN)

(72) Inventors: Pankaj Malhotra, Noida (IN); Gautam Shroff, Bandhwari (IN); Puneet Agarwal, Noida (IN); Lovekesh Vig, Bandhwari (IN)

(73) Assignee: Tata Consultancy Services Limited, Mumbai (IN)

( * ) Notice: Subject to any disclaimer, the term of this patent is extended or adjusted under 35 U.S.C. 154(b) by 397 days.

(21) Appl. No.: 15/019,681

(22) Filed: Feb. 9, 2016

(65) Prior Publication Data

US 2016/0299938 A1   Oct. 13, 2016

(30) Foreign Application Priority Data

Apr. 10, 2015   (IN) .......................... 1516/MUM/2015

(51) Int. Cl.
   *G06F 17/30* (2006.01)
   *G06F 17/18* (2006.01)
   *G06K 9/00* (2006.01)
   *G06K 9/62* (2006.01)
   *G06N 3/04* (2006.01)

(52) U.S. Cl.
   CPC ........ *G06F 17/30371* (2013.01); *G06F 17/18* (2013.01); *G06F 17/30324* (2013.01); *G06K 9/0055* (2013.01); *G06K 9/6284* (2013.01); *G06N 3/0445* (2013.01)

(58) Field of Classification Search
   CPC .. G06F 17/175; G06F 17/18; G06F 17/30324; G06F 17/30371; H04B 10/6165; G06K 9/03; G06K 9/0055; G06K 9/6284
   USPC ........................................................ 707/691
   See application file for complete search history.

(56) References Cited

U.S. PATENT DOCUMENTS 8,015,133 B1    9/2011 Wu et al.
2004/0225202 A1* 11/2004 Skinner .............. A61B 5/02405
                                                        600/300

(Continued)

OTHER PUBLICATIONS

Mahmoud, S. (May 2012). *Identification and Prediction of Abnormal Behaviour Activities of Daily Living in Intelligent Environments* (Doctoral thesis). Retrieved from Academia. 200 pages.

*Primary Examiner* — Hanh B Thai
(74) *Attorney, Agent, or Firm* — Finnegan, Henderson, Farabow, Garrett & Dunner LLP

(57) ABSTRACT

An anomaly detection system and method is provided. The system comprising: a hardware processor; and a memory storing instructions to configure the hardware processor, wherein the hardware processor receives a first time-series data comprising a first set of points and a second time-series data comprising a second set of points, computes a first set of error vectors for each point of the first set, and a second set of error vectors for each point of the second set, each set of error vectors comprising one or more prediction errors; estimates parameters based on the first set of error vectors comprising; applies (or uses) the parameters on the second set of error vectors; and detects an anomaly in the second time-series data when the parameters are applied on the second set of error vectors.

13 Claims, 9 Drawing Sheets

(56) References Cited

U.S. PATENT DOCUMENTS

| | | | | |
|---|---|---|---|---|
| 2007/0110134 A1* | 5/2007 | Guess | ............... | H04B 1/71075 |
| | | | | 375/148 |
| 2008/1020852 | 8/2008 | Thibaux et al. | | |
| 2009/0043547 A1* | 2/2009 | Kirby | .................... | G06F 17/175 |
| | | | | 703/2 |
| 2010/0220824 A1* | 9/2010 | Guess | ............... | H04B 1/71075 |
| | | | | 375/346 |
| 2013/0046721 A1* | 2/2013 | Jiang | ...................... | G01W 1/10 |
| | | | | 706/47 |
| 2013/0343498 A1* | 12/2013 | Guess | ............... | H04B 1/71075 |
| | | | | 375/346 |
| 2015/0006972 A1* | 1/2015 | Jones | .................... | G06F 11/076 |
| | | | | 714/47.2 |
| 2016/0242690 A1* | 8/2016 | Principe | ................. | A61B 5/742 |
| 2016/0323091 A1* | 11/2016 | Inoue | ..................... | H04L 27/38 |

\* cited by examiner

| DATA SET | ARCHITECTURE | | PRECISION | | RECALL | | F$_{0.1}$-SCORE | |
|---|---|---|---|---|---|---|---|---|
| | LSTM | RNN | LSTM | RNN | LSTM | RNN | LSTM | RNN |
| SPACE SHUTTLE | (35-35) | (30-30) | 0.93 | 0.89 | 0.10 | 0.03 | 0.94 | 0.71 |
| POWER | (30-20) | (60-60) | 0.94 | 0.71 | 0.17 | 0.19 | 0.90 | 0.69 |
| ENGINE | (25) | (50-40-30) | 0.94 | 0.98 | 0.12 | 0.10 | 0.89 | 0.90 |

FIG. 2C

ANOMALY DETECTION SYSTEM AND METHOD

PRIORITY CLAIM

This U.S. patent application claims priority under 35 U.S.C. § 119 to: India Application No. 1516/MUM/2015, filed on Apr. 10, 2015. The entire contents of the aforementioned application are incorporated herein by reference.

TECHNICAL FIELD

This disclosure relates generally to detecting anomalies, and, more particularly, to detecting an anomaly from time-series data.

BACKGROUND

Anomaly detection is a process of monitoring of objects such as humans, non-humans, other objects, etc., for the purpose of identifying unusual patterns in behavior, activities, or other changing information. An anomaly is usually detected from time-series data using several existing techniques. Generally, the time-series data extracted using a sensor comprise unique signal patterns corresponding to the anomaly. Traditionally, anomaly detection in time-series data involves using prior knowledge of time window over which temporal analysis is done. Most anomaly detection techniques show poor performance when applied to univariate or multivariate time-series data, since these techniques require a pre-specified time window or data that needs to be pre-processed for these types of time-series data. Further, traditional process monitoring techniques use statistical measures such as cumulative sum (CUSUM) and exponentially weighted moving average (EWMA) over a time window to detect changes in the underlying distribution. The length of this time window generally needs to be pre-determined, require extensive data pre-processing and the results greatly depend on this time window which in turn leads to degrading of the system performance. Current techniques implement prediction models to detect anomaly. However, these techniques do not incorporate inherent unpredictable patterns such as abrupt braking of the vehicle, rapid rise/fall in acceleration/deceleration of the vehicle, etc.

SUMMARY

Embodiments of the present disclosure present technological improvements as solutions to one or more of the above-mentioned technical problems recognized by the inventors in conventional systems.

In one aspect, an anomaly detection system is provided. The system comprising: one or more hardware processors; and a memory storing instructions to configure the one or more hardware processors, wherein the one or more hardware processors are configured by the instructions to: receive a first time-series data comprising a first set of points, wherein the first set of points in the first time-series data is a m-dimensional vector; compute an error vector for each point from the first set of points in the first time-series data to obtain a first set of error vectors, wherein each error vector from the first set of error vectors comprises one or more prediction errors; estimate one or more parameters based on the first set of error vectors comprising the one or more prediction errors; receive a second time-series data comprising a second set of points; compute an error vector for each point from the second set of points in the second time-series data to obtain a second set of error vectors; apply (or use) the one or more parameters on the second set of error vectors; and detect an anomaly (or anomalies) in the second time-series data when the one or more parameters are applied (or used) on the second set of error vectors.

The one or more hardware processors are further configured by the instructions to model at least one of the first set error vectors to obtain a multivariate Gaussian distribution. The one or more hardware processors are further configured by the instructions to obtain one or more likelihood values when the one or more parameters are applied on the second set of error vectors, wherein the one or more likelihood values are obtained for the second set of error vectors, wherein the one or more parameters comprises at least one of mu ($\mu$), sigma ($\Sigma$), and a threshold, wherein when at least one of the one or more likelihood values is less than the threshold, the anomaly is detected in the second time-series data, and wherein the first time-series data and the second time-series data comprises at least one of a univariate time-series data and a multivariate time-series data. The anomaly is detected based on a prediction model by using a long short term memory (LSTM) neural network.

A processor implemented anomaly detection method, comprising: receiving a first time-series data comprising a first set of points, wherein the first set of points in the first time-series data is a m-dimensional vector; computing an error vector for each point from the first set of points in the first time-series data to obtain a first set of error vectors, wherein each error vector from the first set of error vectors comprises one or more prediction errors; estimating one or more parameters based on the first set of error vectors comprising the one or more prediction errors; receiving a second time-series data comprising a second set of points; computing an error vector for each point from the second set of points in the second time-series data to obtain a second set of error vectors; applying the one or more parameters on the second set of error vectors; and detecting an anomaly in the second time-series data when the one or more parameters are applied on the second set of error vectors.

The processor implement anomaly detection method further comprising modeling at least one of the first set of error vectors to obtain a multivariate Gaussian distribution; obtaining one or more likelihood values when the one or more parameters are applied on the second set of error vectors, wherein the one or more parameters comprises at least one of mu ($\mu$), sigma ($\Sigma$), and a threshold, and wherein the anomaly is detected in the second time-series data when at least one of the one or more likelihood values is less than the threshold.

The anomaly is detected based on a prediction model by using a long short term memory (LSTM) neural network. The processor implemented anomaly detection method further comprises detecting one or more anomalies in a third time-series data and a fourth time-series data by applying the set of estimated parameters on (i) a third set of error vectors corresponding the third time-series data and (ii) a fourth set of errors vectors corresponding the fourth time-series data, wherein the first time-series data, the second time-series data, the third time-series data, the fourth time-series data comprises at least one of a univariate time-series data and a multivariate time-series data.

In yet another aspect, one or more non-transitory machine readable information storage mediums comprising one or more instructions, which when executed by one or more hardware processors causes an anomaly detection is provided. The anomaly is detected by performing the step of: receiving a first time-series data comprising a first set of points, wherein the first set of points in the first time-series data is a m-dimensional vector; computing an error vector for each point from the first set of points in the first time-series data to obtain a first set of error vectors, wherein each error vector from the first set of error vectors comprises one or more prediction errors; estimating one or more parameters based on the first set of error vectors comprising the one or more prediction errors; receiving a second time-series data comprising a second set of points; computing an error vector for each point from the second set of points in the second time-series data to obtain a second set of error vectors; applying the one or more parameters on the second set of error vectors; and detecting an anomaly in the second time-series data when the one or more parameters are applied on the second set of error vectors. The one or more parameters comprises of at least one of a mu (μ), sigma (Σ), and a threshold. One or more likelihood value are obtained when the one or more parameters are applied on the second set of error vectors. When at least one of the one or more likelihood values is less than the predetermined threshold, the anomaly is detected.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2C illustrates a table view of Precision, Recall and F0.1-Scores for RNN and LSTM Architectures according to an embodiment of the present disclosure;

DETAILED DESCRIPTION

Figure 1:
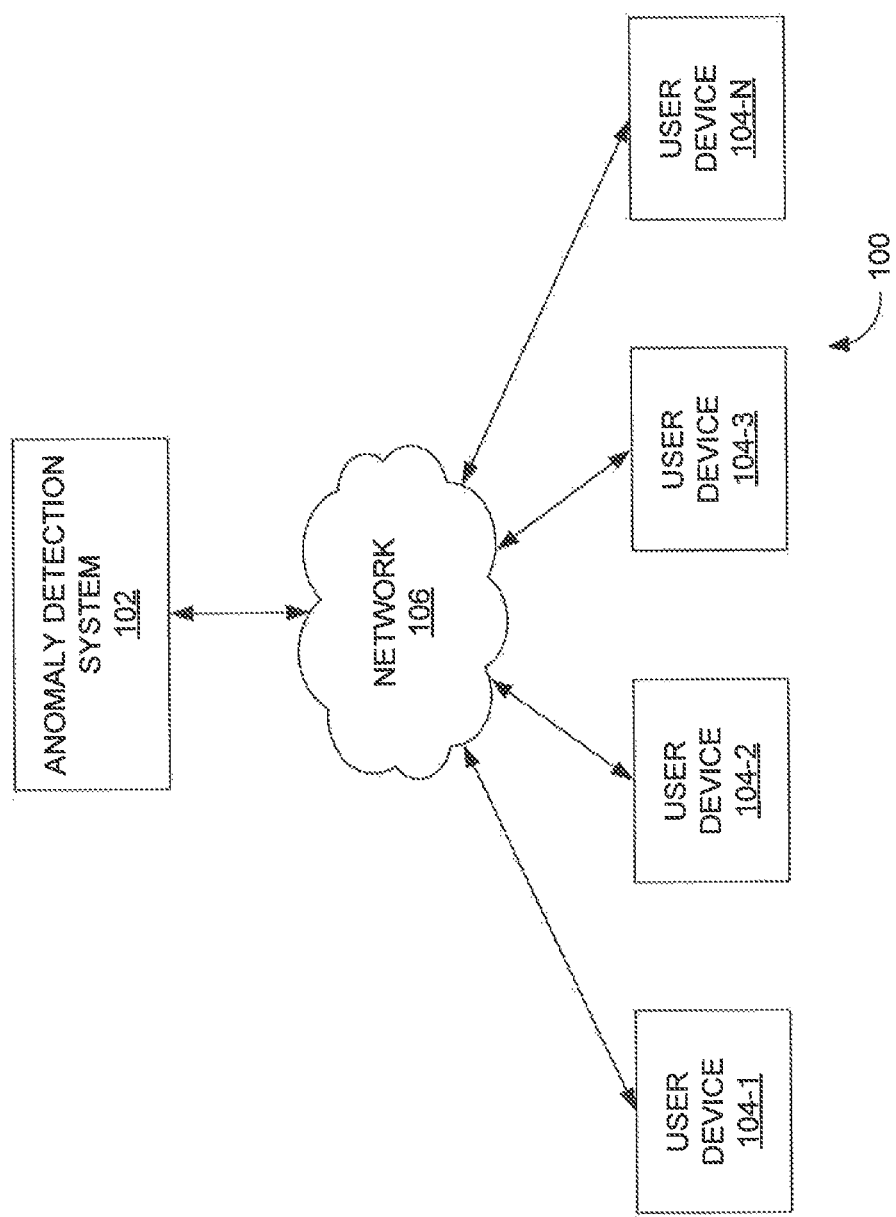
FIG. 1 illustrates a network implementation of an anomaly detection system according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

An anomaly detection system and method is provided. The anomaly detection system receives a time-series data comprising one or more points related to an anomaly, wherein the time-series data comprises at least one of a univariate time-series data and a multivariate time-series data, compute an error vector for each of the one or more points in the time-series data to obtain error vectors, wherein each error vector comprises prediction errors, estimate one or more parameters based on the error vectors, wherein the one or more parameters is at least one of mu (μ) and sigma (Σ); and detect the anomaly based on the one or more parameters.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates a network implementation 100 of an anomaly detection system 102 according to an embodiment of the present disclosure. The anomaly detection system 102 is communicatively coupled to a network 106 which in turn is connected to a plurality of User Devices 104-1, 104-2, 104-3 . . . 104-N, collectively referred to as the user devices 104 and individually referred to as a user device 104. The user devices 104 may be Implemented as any of a variety of conventional computing devices, including, for example, servers, a desktop PC, a notebook or portable computer, a workstation, a mainframe computer, an entertainment device, cellular phones, smart phones, personal digital assistants (PDAs), portable computers, desktop computers, tablet computers, phablets, and an internet appliance.

The anomaly detection system 102 is connected to the user devices 104 over the network 106. The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols. Further, the network 106 may include network devices, such as network switches, hubs, routers, HBAs, for providing a communication link between the anomaly detection system 102 and the user devices 104.

In one embodiment, the anomaly detection system 102 may facilitate the detection of an anomaly from time-series data. The anomaly detection system 102 may employ one or more sensors to capture the time-series data. The time-series data comprises at least one of a univariate time-series data and a multivariate time-series data. The univariate time-series data as used herein refers to a time-series data comprising one or more points, where each point is a unidimensional point (or one dimensional point). The multivariate time-series data as used herein refers to a time-series data comprising one or more points, where each point is a multidimensional point. The anomaly detection system 102 receives a first time-series data comprising a first set of points. The first set of points in the first time-series data is an m-dimensional vector, where 'm' is a natural number. Upon receiving the first time-series data, the anomaly detection system 102 computes an error vector for each of the first set of points in the first time-series data to obtain a first set of error vectors. Each error vector from the first set of error vectors comprises one or more prediction errors. The anomaly detection system 100 estimates one or more parameters based on the first set of error vectors comprising the one or more prediction errors. The anomaly detection system 100 further receives a second time-series data comprising a second set of points, computes an error vector for each point from the second set of points and obtain a second set of error vectors (comprising one or more error vectors). Each error vector from the second set of error vectors comprises one or more prediction errors. The anomaly detection system 100 further applies the one or more parameters on the second set of error vectors. The anomaly detection system 100 then detects an anomaly in the second time-series data when the one or more parameters are applied on the second set of error vectors. The one or more parameters comprises but is not limited to mu ($\mu$), sigma ($\Sigma$), and a threshold ($\tau$). The anomaly is detected in the second time-series data by using a prediction model, where the anomaly detection system 102 learns the prediction model using one or more stacked long short term memory (LSTM) neural networks, and then computes a prediction error distribution using which one or more anomalies are detected, in one example embodiment.

The above methodology is described by way of an example below for detecting an anomaly: For example, a time-series data $X=\{x^{(1)}, x^{(2)}, \ldots, x^{(n)}\}$ is received by the anomaly detection system 102 from the one or more sensors comprising but are not limited to pressure sensor, speed sensor, gear sensor, temperature sensor, measurement sensor, control sensor, Electrocardiogram (ECG) sensor, fuel sensor, actuation sensor, power consumption sensor, etc., where each point $x^{(t)} \in R_m$ in the time-series is an m-dimensional vector $\{x_1^{(t)}, x_2^{(t)}, \ldots, x_m^{(t)}\}$, whose elements correspond to the input variables. The anomaly detection system 102 implements a prediction model to learn and predict the next 'l' values for 'd' of the input variables such that $1 \leq d \leq m$. The normal sequence(s) are divided into one or more sets: normal train ($s_N$), normal validation-1 ($v_{N1}$), normal validation-2 ($v_{N2}$), and normal test ($t_N$). Normal sequence refers to a regular pattern of time-series that indicates a normal behavior of a system. The anomalous sequence(s) are divided into one or more sets: anomalous validation ($v_A$), and anomalous test ($t_A$). Anomalous sequence refers to an irregular pattern of time-series that indicates an unusual behavior of the system.

Although the present subject matter is explained considering that the anomaly detection system 102 is implemented for detecting the anomaly from the second time-series data (or subsequent time-series data), it may be understood that the anomaly detection system 102 may also be implemented in a variety of computing systems, such as a laptop computer, a desktop computer, a notebook, a workstation, a mainframe computer, a server, a network server, a tablet, a mobile phone, and the like. In one embodiment, the anomaly detection system 102 may be implemented in a cloud-based environment.

Figure 2A:
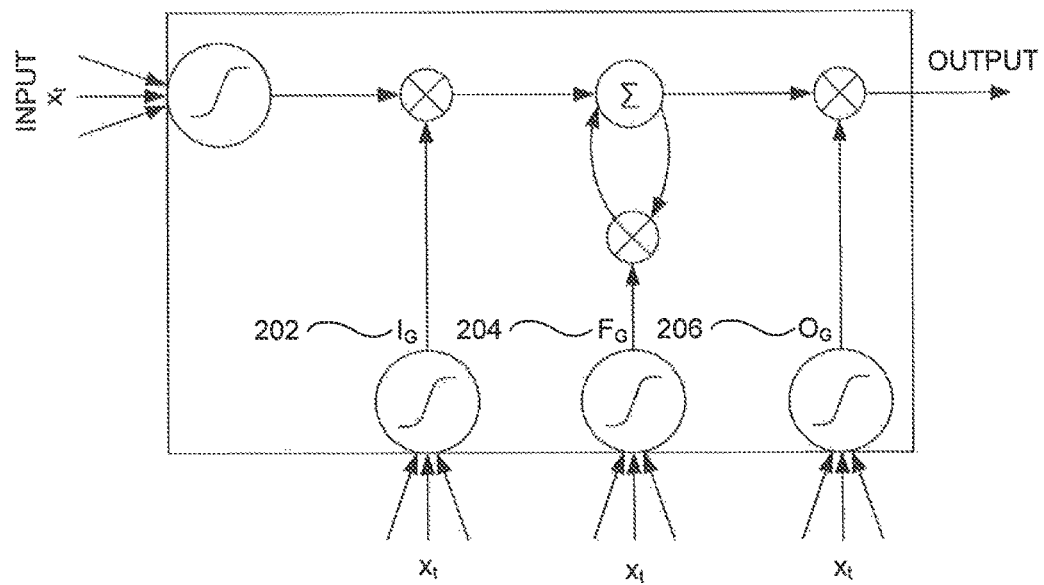
FIG. 2A illustrates a long-short term memory cell according to an embodiment of the present disclosure.

With reference to FIG. 1, FIG. 2A illustrates a long-short term memory cell of the anomaly detection system 102 according to an embodiment of the present disclosure. Traditional process monitoring techniques use statistical measures such as cumulative sum (CUSUM) and exponentially weighted moving average (EWMA) over a time window to detect changes in an underlying distribution. The length of this time window generally needs to be predetermined and the results greatly depend on this parameter. The LSTM neural network overcomes the vanishing gradient problem experienced by recurrent neural networks (RNNs) by employing multiplicative gates that enforce constant error flow through the internal states of special units called 'memory cells'. The gates: input ($I_G$) 202, forget ($F_G$) 204, and output ($O_G$) 206 prevent memory contents from being perturbed by irrelevant inputs and outputs as shown in FIG. 2A, thereby allowing for long-term memory storage. Due to this ability to learn the long term correlations in a sequence, the LSTM networks obviate the need for a pre-specified time window and are capable of accurately modelling complex multivariate sequences.

With reference to FIG. 1 through FIG. 2A, FIG. 2B illustrates a stacked architecture of one or more hidden layers of an LSTM network according to an embodiment of the present disclosure. It is evident from the FIG. 2B that stacking recurrent hidden layers of sigmoidal (or LSTM) activation units in a network captures the structure of time-series data and allows for processing time-series at different time scales. A notable instance of using hierarchical temporal processing for anomaly detection is the Hierarchical Temporal Memory (HTM) system that attempts to mimic the hierarchy of cells, regions, and levels in the neocortex. Also, temporal anomaly detection approaches learn to predict time-series and use prediction errors to detect anomaly.

A predictor is used to model normal behaviour, and subsequently use the prediction errors to identify abnormal behaviour. In order to ensure that the networks capture the temporal structure of the sequence, one or more time-series data are predicted into the future. Thus each point in the time-series data has multiple corresponding predicted values made at different points in the past, giving rise to multiple error values. The probability distribution of the errors made while predicting on normal data is then used to obtain the probability of normal behaviour on the test data. When control variables (such as vehicle accelerator or brake) are also present, the LSTM network is made to predict the control variable in addition to the dependent variables. This forces the LSTM network to learn the normal usage patterns via the joint distribution of the prediction errors for the control and dependent sensor variables. As a result, the obvious prediction errors made when a control input changes are already captured and do not contribute towards an anomaly detection.

Figure 2B:
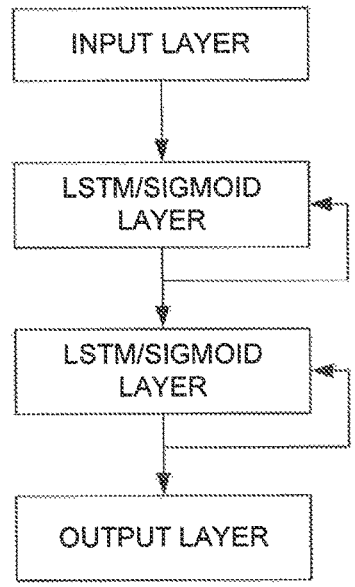
FIG. 2B Illustrates a stacked architecture of one or more hidden layers of an LSTM network according to an embodiment of the present disclosure.

With reference to FIG. 1 through FIG. 2B, FIG. 2C illustrates a table view of Precision, Recall and F0.1-Scores for RNN and LSTM Architectures according to an embodiment of the present disclosure. A stacked LSTM network based prediction model is implemented. By way of an example, the following embodiments are described herein, as such (30-20) hidden units is considered. (30-20) indicates 30 and 20 units in the 1st and 2nd hidden layers of the LSTM network. One unit in the input layer corresponds for each of the m dimensions, d×l units in the output layer such that, there is one unit for each of the 'l' future predictions for each of the 'd' dimensions. The LSTM units in a hidden layer are connected through recurrent connections. The LSTM layers are stacked such that each unit in a lower LSTM hidden layer is connected to each unit in the LSTM hidden layer above it through feedforward connections as depicted in FIG. 2B. The anomaly detection system 102 learns the prediction model using the sequence(s) in $s_N$. The set $v_{N1}$ is used for early stopping while learning the network weights.

With a prediction length of l, each of the selected d dimensions of $x^{(t)} \in X$ for $1 < t \leq n-1$ is predicted 'l' times. An error vector $e^{(t)}$ is computed for point $x^{(t)}$ as: $[e_{11}^{(t)}, \ldots, e_{1l}^{(t)}, \ldots, e_{d1}^{(t)}, \ldots, e_{dl}^{(t)}]$, where $e_{ij}^{(t)}$ is the difference between $x^{(t)}$ and its value as predicted at time t−j. The prediction model trained on $s_N$ is used to compute the error vectors for each point in the validation and test sequences. The error vectors are modelled to fit a multivariate Gaussian distribution $N=N(\mu,\Sigma)$. The likelihood value 'p$^{(t)}$' of observing an error vector $e^{(t)}$ is given by the value of N at $e^{(t)}$. The error vectors for the points from $v_{N1}$ are used to estimate the parameters μ (a mean vector) and Σ (covariance matrix) using a Maximum Likelihood Estimation, in one example embodiment.

An observation $x^{(t)}$ is classified as 'anomalous detection' if $p^{(t)} <$, else the observation is classified as 'normal behavior detection'. The sets $v_{N2}$ and $v_A$ are used to learn τ by maximizing $F_\beta$-Score (where anomalous points belong to positive class and normal points belong to negative class).

Figure 3:
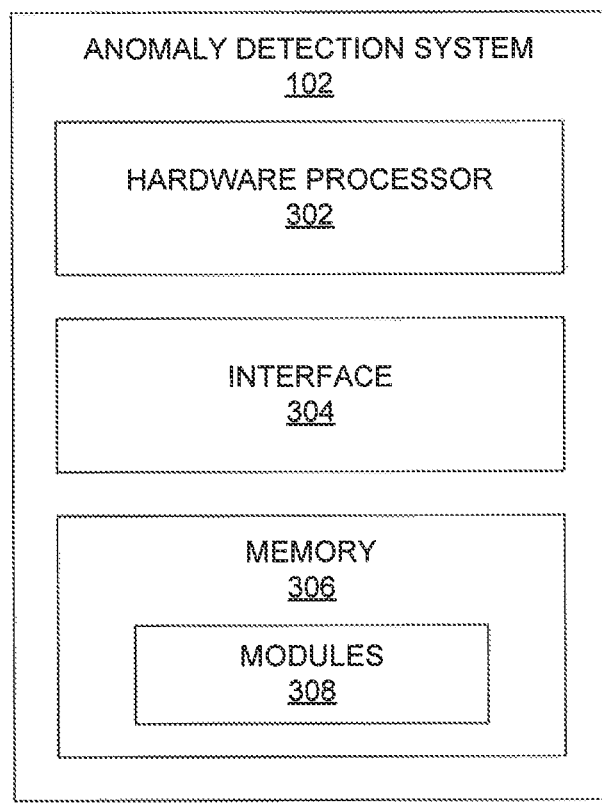
FIG. 3 illustrates is a block diagram of the anomaly detection system of FIG. 1 according to an embodiment of the present disclosure.

With reference to FIGS. 1 and 2C, FIG. 3 illustrates a block diagram of the anomaly detection system 102 of FIG. 1 according to an embodiment of the present disclosure. In one embodiment, the system 102 may include at least one hardware processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Further, the at least one processor 302 may comprise a multi-core architecture. Among other capabilities, the at least one processor 302 is configured to fetch and execute computer-readable instructions or modules stored in the memory 306.

The I/O interface 304 may Include a variety of software and hardware interfaces, for example, a web interface, a graphical user interface, and the like. The I/O interface 304 may allow the system 102 to interact with a user directly or through the user devices 104. Further, the I/O interface 304 may enable the system 102 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 306 may include the one or more modules 308 as described.

The modules include routines, programs, objects, components, data structures, etc., which perform particular tasks or implement particular abstract data types. In one implementation, the above described embodiments and the methodology may be implemented and executed by using the modules 308 (or 308A-N). For example, the anomaly detection system 102 comprises an error vector computation module that computes an error vector for each of the one or more points (i) in the first time-series data to obtain the first set of error vectors and (ii) in the second time-series data to obtain the second set of error vectors. Each error vector from the first set and the second set of error vectors comprises one or more prediction errors. The anomaly detection system 102 further comprises an estimation module that estimates one or more parameters (μ—mean vector, Σ—covariance matrix, and the threshold (τ) based on the first set of error vectors. The one or more parameters are then applied on the second set of error vectors, based on which an anomaly is detected in the second time-series data. The one or more parameters are applied on the second set of error vectors to obtain one or more likelihood values. The one or more likelihood values are then compared with the threshold (τ). When at least one of the one or more likelihood values is less than the threshold (τ), the anomaly is detected. When l=1, mu (μ) and sigma (Σ) are numbers, in one example embodiment. The anomaly detection system 102 may further comprise an anomaly detection module that detects an anomaly by using on the one or more parameters. The anomaly detection system 102 may further comprise a prediction module that executes a prediction model to learn and predict the next 'l' values for 'd' of the input variables such that $1 \leq d \leq m$ as described above.

The anomaly detection system 102 further comprises a modeling module that models the one or more error vectors to obtain a multivariate Gaussian distribution. The anomaly detection system 102 also comprises a classification module that classifies an event as at least one of an anomaly detection or normal behavior detection based on a comparison of the likelihood value(s) with the threshold (τ) stored in the memory 306. The error vector computation module, the estimation module, the anomaly detection module, the modeling module, the classification module, and the prediction module are implemented as a logically self-contained part of a software program that when executed perform the above method described herein, in one embodiment.

In another embodiment, the error vector computation module, the estimation module, the anomaly detection module, the modeling module, the classification module, and the prediction module are implemented as a self-contained hardware component. In yet another embodiment, the above modules may be implemented as a self-contained hardware component, with a logically self-contained part of a software program embedded into each of the hardware component.

The system 102 may further comprise other modules that may include programs or coded instructions to supplement applications and functions of the system 102. The memory 306 stores data, amongst other things, and serves as a repository for storing data processed, received, and generated by one or more of the modules. The data may also include a system database, and other data 322. The other data may include data generated as a result of the execution of one or more modules in the other modules.

In one implementation, at first, the one or more sensors may be positioned across an environment for detecting events related to the environment. For example, the sensors may be positioned across a space shuttle for capturing time-series data related to an event, based on which for deviations from normal behavior are detected. The time-series data may comprise timestamp information, and/or data points.

The time-series data captured by the one or more sensors may be of variable lengths such that the time duration of the time-series data may vary. Thus, the time-series data captured by the sensors (more than one sensor) may be used for determining the event related to the vehicle. The event may be determined accurately as the time-series data from multiple sensors may be used.

With reference to FIGS. 1 through 3, FIGS. 4A-4F illustrate a graphical representation of time-series data sequences samples received from one or more sensors for detecting one or more events using the anomaly detection system 102 of FIG. 1 according to an embodiment of the present disclosure. Sample sequences for the four datasets are shown in (A)-(F) with y-axes labeled 'Sensor' in 4(A)-4(E) and 'Demand' in 4(F). Normal behavior parts are indicated as 402, and anomalous parts are indicated as 404. The corresponding likelihood values from the error distribution are shown in log-scale with y-axes labeled 'p' along with the dashed lines showing the threshold ($\tau$), and indicated as 406, and activation sequences of the hidden layers indicated as 408.

Figure 4A:
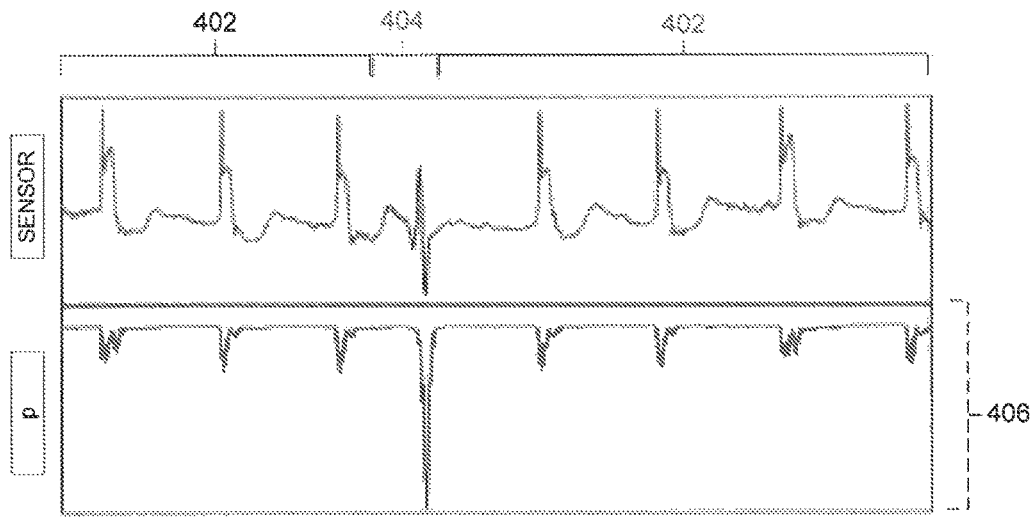
FIGS. 4A-4F illustrate a graphical representation of time-series data sequences samples received from one or more sensors for detecting one or more events using the anomaly detection system of FIG. 1 according to an embodiment of the present disclosure.

Referring to FIG. 4A, FIG. 4A illustrates qtdb/sel 102 ECG dataset containing a single short term anomaly corresponding to a pre-ventricular contraction. Since the ECG dataset has only one anomaly, a threshold may not be calculated or configured, and corresponding $F_{0.1}$-Score for this dataset; the anomaly detection system 102 learns the prediction model using a normal ECG subsequence and computes the likelihood of the error vectors for the remaining sequence from the time-series.

Figure 4B:
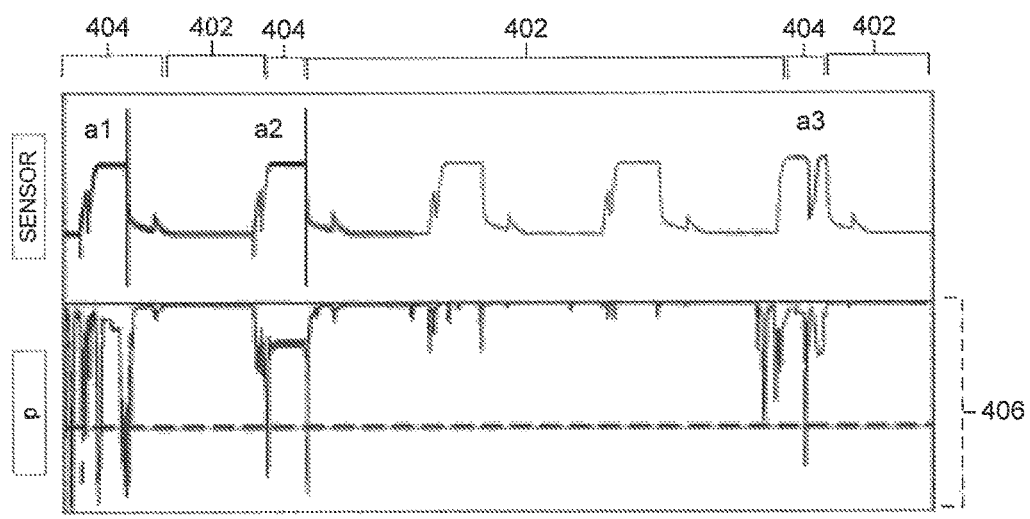

FIG. 4B illustrates a space shuttle marotta valve time-series data set. This dataset has both short time period patterns and long time-period patterns that approximately last 100s of time-steps. There are three anomalous regions in the dataset marked as 404 (a1, a2, and a3) in FIG. 4B. Region a3 is a more easily discernible anomaly, whereas regions a1 and a2 correspond to more subtle anomalies that are not easily discernable at this resolution.

Figure 4C:
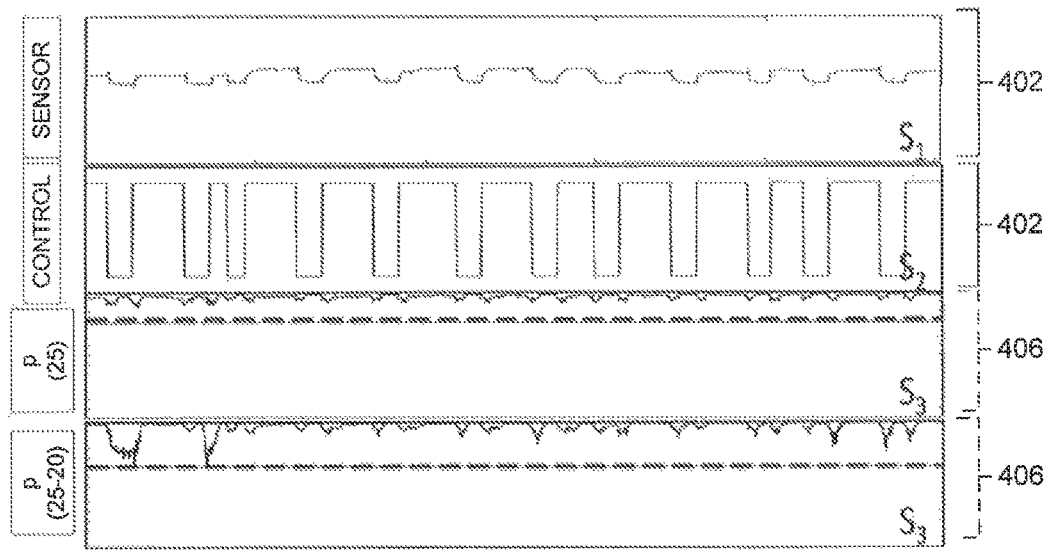
Figure 4D:
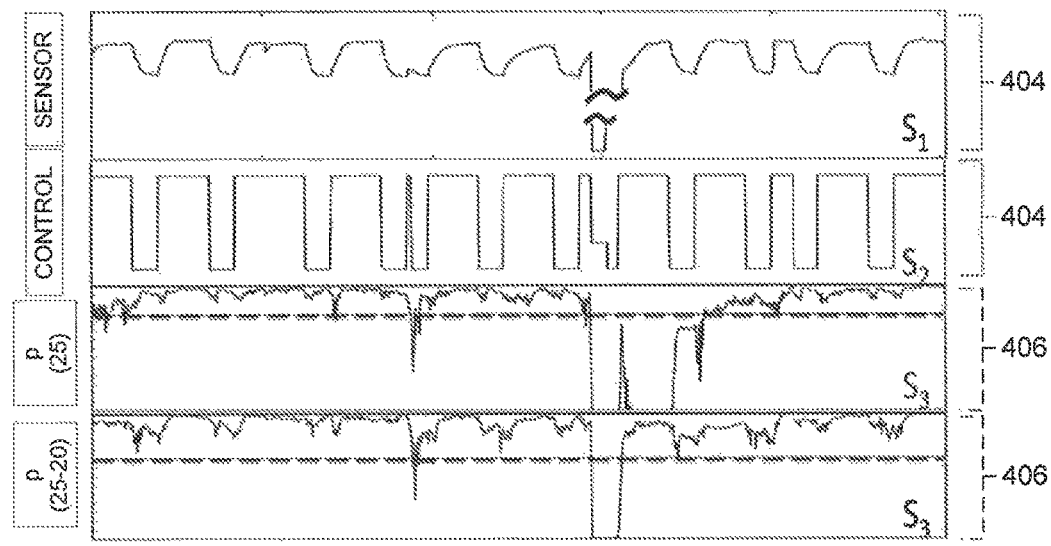
Figure 4E:
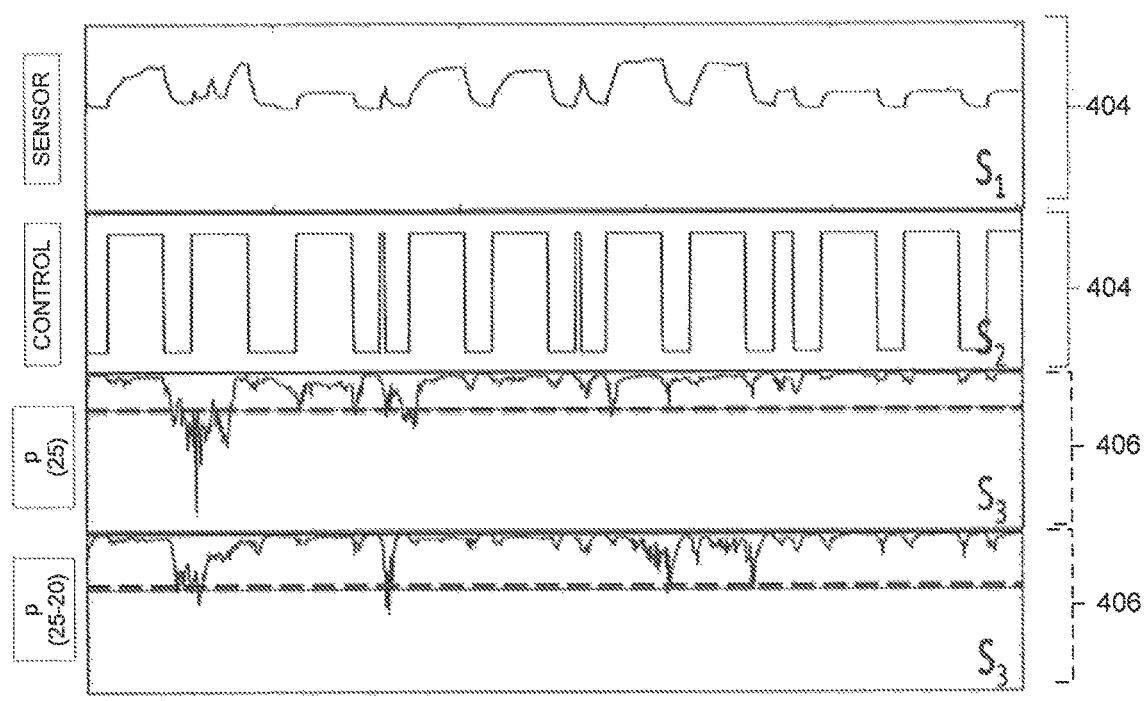

FIGS. 4C-4E show the original subsequences for the two dimensions being predicted (labeled 'Sensor' and 'Control') for Engine dataset, and the likelihood values for two architectures. FIG. 4C shows sample normal behavior of locomotive engine such as a motor—whereas FIGS. 4(D) and 4(E) show two different instances of faulty engines. Plots with same $S_i$ (i=1, 2, 3) have same y-axis scale. FIG. 4C-4E illustrates a multi-sensor engine dataset. This dataset has readings from 12 different sensors. One of the sensors is the 'control' sensor to the engine that measures control variables, and the rest of the sensors measure dependent variables like temperature, torque, and so on. The anomaly detection system 102 is first trained using normal sequences $s_N$ (to learn the prediction model) corresponding to one or more independent faults and $F_\beta$-Score is measured on a distinct set of the one or more independent faults. In other words, the system 102 is first trained using normal sequences $s_N$ (to learn the prediction model), and then the threshold is computed by maximizing the $F_\beta$-Score using normal $v_{N2}$ and fault (anomalous) $v_A$ sequences. The 'control' sensor is chosen together with one of the dependent variables as the dimensions to be predicted.

Figure 4F:
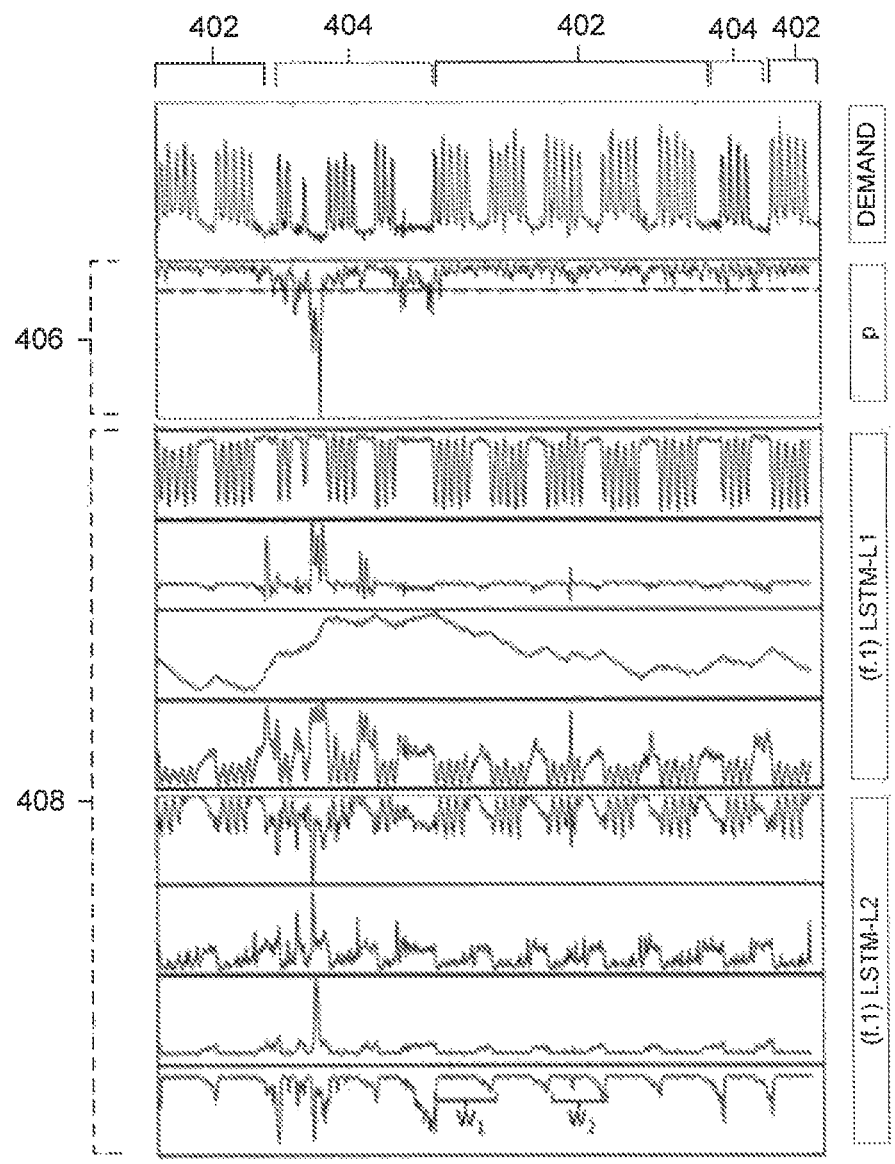
Figure 5:
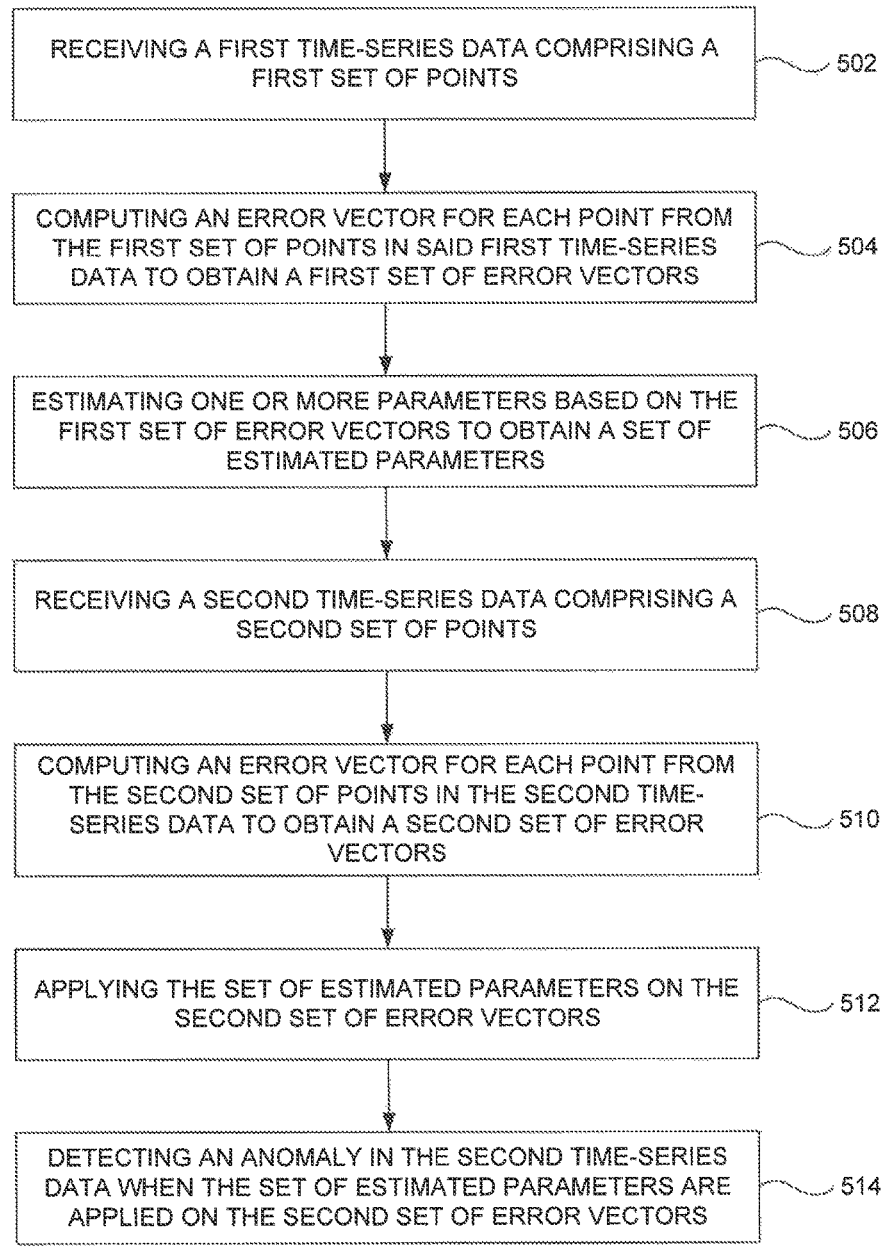
FIG. 5 is a flow diagram illustrating an anomaly detection method using the anomaly detection system of FIG. 1 according to an embodiment of the present disclosure.

FIG. 4F illustrates a power demand dataset. The normal behavior corresponds to weeks where the power consumption has five peaks corresponding to the five weekdays and two troughs corresponding to the weekend. This dataset has a very long term pattern spanning hundreds of time steps. Additionally, the data is noisy because the peaks do not occur exactly at the same time of the day. (f.1) and (f.2) show activation sequences for selected LSTM hidden units for lower (LSTM-L1) and higher (LSTM-L2) hidden layer respectively.

The key observations from the above experimental results indicate the following:

(i) In FIGS. 4A and 4E, the likelihood values $p^{(t)}$ are significantly lower in the anomalous regions than the normal regions for all datasets. Further, the $p^{(t)}$ values do not remain low throughout the anomalous regions. $\beta \ll 1$ (0.1) is deliberately used so as to give a higher importance to precision over recall. It is to be noted that although all points in an anomalous subsequence have a label of 'anomalous', but in practice, there may be a plurality of points of 'normal' behavior even amongst these points. So it suffices that a significant percentage of the points in an 'anomalous' subsequence are predicted as anomalous. The values of $\tau$ obtained (represented by dashed lines in the $p^{(t)}$ plots in FIGS. 4A and 4F) suggest $F_\beta$-Score (as described in FIG. 2) to be a suitable metric for the datasets considered.

(ii) The positive likelihood ratio (true positive rate to false positive rate) has been found to be high (more than 34.0) for all the datasets. High positive likelihood ratio value suggests that the probability of reporting an anomaly in anomalous region is much higher than the probability of reporting an anomaly in normal region.

(iii) The activations of selected hidden units, four each from layers LSTM-L1 (lower hidden layer with 30 units) and LSTM-L2 (higher hidden layer with 20 units) for the power dataset are shown in FIG. 4 (f.1) and (f.2). Subsequences marked $w_1$ and $w_2$ in the last activation sequence shown in FIG. 4 (f.2) indicate that this hidden unit activation is high during the weekdays and low during weekends. These are instances of high-level features being learned by the higher hidden layer, which appear to be operating at a weekly time-scale.

(iv) As shown in FIG. 2C, for the 'ECG' and 'engine' datasets, which do not have any long-term temporal dependence, both Long-short term memory-anomaly detection (LSTM-AD) and Recurrent neural network-anomaly detection (RNN-AD) perform equally well. LSTM-AD refers to an anomaly detection using a long-short term memory neural network. RNN-AD refers to an anomaly detection using a recurrent neural network with sigmoidal units in the hidden layers. On the other hand, for 'space shuttle' and 'power demand' datasets which have long-term temporal dependencies along with short-term dependencies, LSTM-AD shows significant improvement of 18% and 30% respectively over RNN-AD in terms of $F_{0.1}$-Score.

(v) The fraction of anomalous points detected for periods prior to faults for the 'engine' dataset is higher than that during normal operation. This suggests that the embodiments and/or the methodology described herein may be implemented for early fault prediction as well.

With reference to FIGS. 1 through 4, FIG. 5 is a flow diagram illustrating an anomaly detection method using the anomaly detection system 102 of FIG. 1 according to an embodiment of the present disclosure. In step 502, a first time-series data comprising a first set of points is received. The first set of points in the time-series data is a m-dimensional vector, where 'm' is a natural number ranging from 1 to n. In step 504, an error vector is computed for each of the first set of points in the first time-series data to obtain a first set of error vectors. Each of the first set of error vectors comprises one or more prediction errors. In step 506, one or more parameters are estimated based on the first set of error vectors to obtain a set of estimated parameters. The set of estimated parameters is at least one of mu ($\mu$), sigma ($\Sigma$), the threshold ($\tau$). In step 508, a second time-series data comprising a second set of points is received. The second set of points in the second time-series data is a m-dimensional vector. In step 510, an error vector for each of the second set of points in the second time-series data is computed to obtain a second set of error vectors. In step 512, the set of estimated parameters are applied on the second set of error vectors of the second time-series data. Each error vector in the second set of error vectors comprises one or more prediction errors. In step 514, an anomaly detected in the second time-series data when the set of estimated parameters are applied on the second set of error vectors. More specifically, when the set of estimated parameters are applied on the second set of error vectors, one or more likelihood values are obtained. Any combination of parameters from the set of estimated parameters may be applied (or used) on the second set of error vectors of the second time-series data, in one example embodiment. The anomaly is detected when at least one of the one or more likelihood values is less than the threshold. At least one of the first set of error vectors is modelled to obtain a multivariate Gaussian distribution. The anomaly is detected based on a prediction model by using a long short term memory (LSTM) neural network. The first time-series data and the second time-series data comprises at least one of a univariate time-series data and a multivariate time-series data.

During a learning phase, the LSTM based prediction model, the Gaussian parameters mu ($\mu$) and sigma ($\Sigma$), the threshold ($\tau$) are learnt. All of these are then used for anomaly detection, i.e., to classify the points in a new time-series (or subsequent time-series data) as normal or anomalous. The prediction model is used to get error vectors which are then used to obtain the likelihood values using mu and sigma learnt using the training phase. If the likelihood is lower than $\tau$ learnt during the learning phase, the point is classified as anomalous else it is classified as normal. In other words, the anomaly detection system 102 uses the same set of estimated parameters mu ($\mu$) and sigma ($\Sigma$), the threshold ($\tau$) on a third received time-series data, and a fourth received time-series data. For example, when the third time-series data comprising a third set of points is received by the anomaly detection system 102, the anomaly detection system 102 computes an error vector for each of points in the third set of points to obtain a third set of error vectors. The set of estimated parameters mu ($\mu$) and sigma ($\Sigma$), the threshold ($\tau$) are applied or used on the third set of error vectors to obtain a set of likelihood values (also referred as a third set of likelihood values) corresponding (or specific) to the third time-series data. One or more anomalies are detected in the third time-series data when the set of estimated parameters mu ($\mu$) and sigma ($\Sigma$), the threshold ($\tau$) are applied or used on the third set of error vectors. More specifically, when at least one of the set of likelihood values obtained is less than the threshold ($\tau$), the one or more anomalies are detected in the third time-series data. Likewise, when the fourth time-series data comprising a fourth set of points is received by the anomaly detection system 102, the anomaly detection system 102 computes an error vector for each of points in the fourth set of points to obtain a fourth set of error vectors. The set of estimated parameters mu ($\mu$) and sigma ($\Sigma$), the threshold ($\tau$) are applied or used on the fourth set of error vectors to obtain a set of likelihood values (also referred as a fourth set of likelihood values) corresponding (or specific) to the fourth time-series data. One or more anomalies are detected in the fourth time-series data when the set of estimated parameters mu ($\mu$) and sigma ($\Sigma$), the threshold ($\tau$) are applied or used on the fourth set of error vectors. More specifically, when at least one of the fourth set of likelihood values obtained is less than the threshold ($\tau$), the one or more anomalies are detected in the fourth time-series data, and so on. Like, the first time-series data and the second time-series data, the third time-series data and the fourth time-series data comprises at least one of the univariate time-series data and the multivariate time-series data.

The written description describes the subject matter herein to enable any person skilled in the art to make and use the embodiments and/or the methodology described herein. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RNV) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein. (We can even illustrate this by a representative computer architecture in drawings.)

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The anomaly detection system 102 implements stacked LSTM networks that are able to learn higher level temporal patterns without prior knowledge of the pattern duration, and so the stacked LSTM networks may be a viable technique to model normal time-series behavior, which can then be used to detect anomalies. The anomaly detection system 102 implements an LSTM-AD technique datasets which involve modelling small-term as well as long-term temporal dependencies. In other words, dependencies among different dimensions of a multivariate time-series data can be learnt by LSTM network which enables to learn normal behavior in an efficient manner and hence detect anomalous behavior more accurately. As can be depicted from the FIG. 2, the table Illustrates a comparison of experimental results of LSTM-AD technique and RNN-AD, which suggests that LSTM based prediction models may be more robust when compared to RNN based models, especially when there is no priori information whether the normal behavior involves long-term dependencies or not. Unlike conventional anomaly detection system and method, the anomaly detection system 102 does not require any feature engineering or pre-processing. The proposed embodiments enable the anomaly detection system 102 to easily capture long term correlations in time-series using LSTMs which improves anomaly detection. The anomaly detection system 102 uses the 'normal data' to learn the prediction model without any need of anomalous data. The proposed embodiments described and implemented by the anomaly detection system 102 can be leveraged but not limited to, in (i) Internet of Things (IoT) setting to detect anomalous behavior, (ii) fault detection in manufacturing domain, monitoring health, etc.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented anomaly detection method comprising
   one or more hardware processors coupled with a memory for:
   receiving a first time-series data comprising a first set of points, wherein said first set of points in said first time-series data is a m-dimensional vector;
   computing an error vector for each point from said first set of points in said first time-series data to obtain a first set of error vectors, wherein each error vector from said first set of error vectors comprises one or more prediction errors;
   estimating one or more parameters based on said first set of error vectors to obtain a set of estimated parameters;
   receiving a second time-series data comprising a second set of points; computing an error vector for each point from said second set of points in said second time-series data to obtain a second set of error vectors;
   applying said set of estimated parameters on said second set of error vectors; and
   detecting an anomaly in said second time-series data when said set of estimated parameters are applied on said second set of error vectors, wherein said anomaly is detected based on a prediction model by using a long short term memory (LSTM) neural network.

2. The method of claim 1, further comprising modeling at least one of said first set error vectors to obtain a multivariate Gaussian distribution.

3. The method of claim 1, further comprising obtaining one or more likelihood values when said set of estimated parameters are applied on said second set of error vectors.

4. The method of claim 3, wherein said set of estimated parameters comprises at least one of mu ($\mu$), sigma ($\Sigma$), and a threshold.

5. The method of claim 4, wherein said anomaly is detected in said second time-series data when at least one of said one or more likelihood values is less than said threshold.

6. The method of claim 1, further comprising detecting an anomaly in a third time-series data and a fourth time-series data by applying the set of estimated parameters on (i) a third set of error vectors corresponding the third time-series data and (ii) a fourth set of errors vectors corresponding the fourth time-series data, wherein said first time-series data, said second time-series data, said third time-series data, said fourth time-series data comprises at least one of a univariate time-series data and a multivariate time-series data.

7. An anomaly detection system comprising:
   one or more hardware processors; and
   a memory storing instructions to configure the one or more hardware processors, wherein the one or more hardware processors are configured by the instructions to:
   receive a first time-series data comprising a first set of points, wherein said first set of points in said first time-series data is a m-dimensional vector,
   compute an error vector for each point from said first set of points in said first time-series data to obtain a first set of error vectors, wherein each error vector from said first set of error vectors comprises one or more prediction errors;

estimate one or more parameters based on said first set of error vectors to obtain a set of estimated parameters;

receive a second time-series data comprising a second set of points;

compute an error vector for each point from said second set of points in said second time-series data to obtain a second set of error vectors;

apply said set of estimated parameters on said second set of error vectors; and detect an anomaly in said second time-series data when said set of estimated parameters are applied on said second set of error vectors, wherein said anomaly is detected based on a prediction model by using a long short term memory (LSTM) neural network.

8. The system of claim 7, wherein said one or more hardware processors are further configured by the instructions to model at least one of said first set error vectors to obtain a multivariate Gaussian distribution.

9. The system of claim 7, wherein said one or more hardware processors are further configured by the instructions to obtain one or more likelihood values when said set of estimated parameters are applied on said second set of error vectors.

10. The system of claim 7, wherein said set of estimated parameters comprises at least one of mu ($\mu$), sigma ($\Sigma$), and a threshold.

11. The system of claim 10, wherein when at least one of said one or more likelihood values is less than said threshold, said anomaly is detected in said second time-series data, and wherein said first time-series data and said second time-series data comprises at least one of a univariate time-series data and a multivariate time-series data.

12. One or more non-transitory machine readable information storage mediums comprising one or more instructions, which when executed by one or more hardware processors causes an anomaly detection by performing the step of:

receiving a first time-series data comprising a first set of points, wherein said first set of points in said first time-series data is a m-dimensional vector;

computing an error vector for each point from said first set of points in said first time-series data to obtain a first set of error vectors, wherein each error vector from said first set of error vectors comprises one or more prediction errors;

estimating one or more parameters based on said first set of error vectors to obtain a set of estimated parameters;

receiving a second time-series data comprising a second set of points;

computing an error vector for each point from said second set of points in said second time-series data to obtain a second set of error vectors;

applying said set of estimated parameters on said second set of error vectors; and detecting an anomaly in said second time-series data when said set of estimated parameters are applied on said second set of error vectors, wherein said anomaly is detected based on a prediction model by using a long short term memory (LSTM) neural network.

13. The one or more non-transitory machine readable information storage mediums of claim 12, wherein said set of estimated parameters comprises of at least one of a mu ($\mu$), sigma ($\Sigma$), and a threshold, wherein one or more likelihood value are obtained when said set of estimated parameters are applied on said second set of error vectors, and wherein when at least one of said one or more likelihood values is less than said predetermined threshold, said anomaly is detected.

* * * * *